United States Patent Office 3,182,486
Patented May 11, 1965

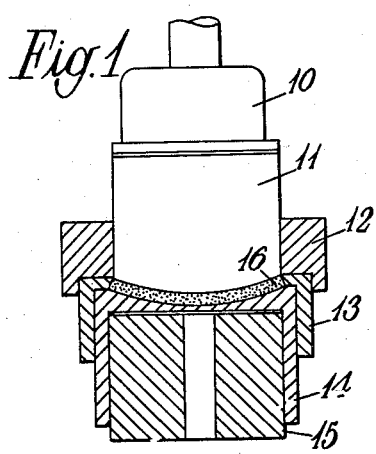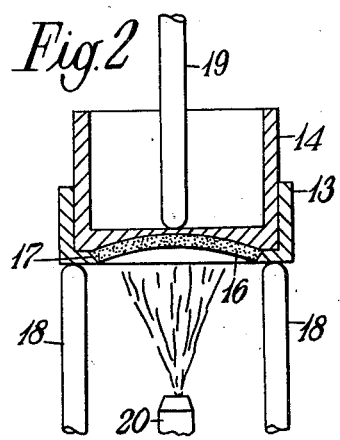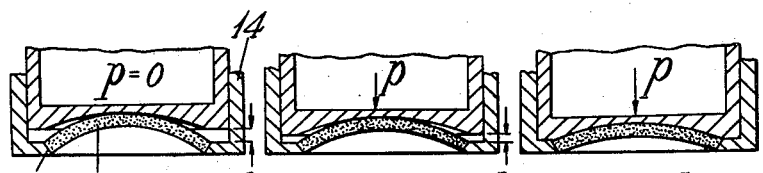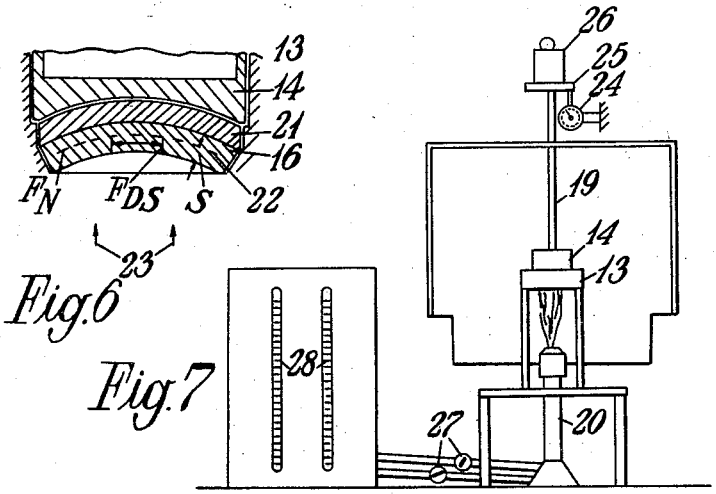

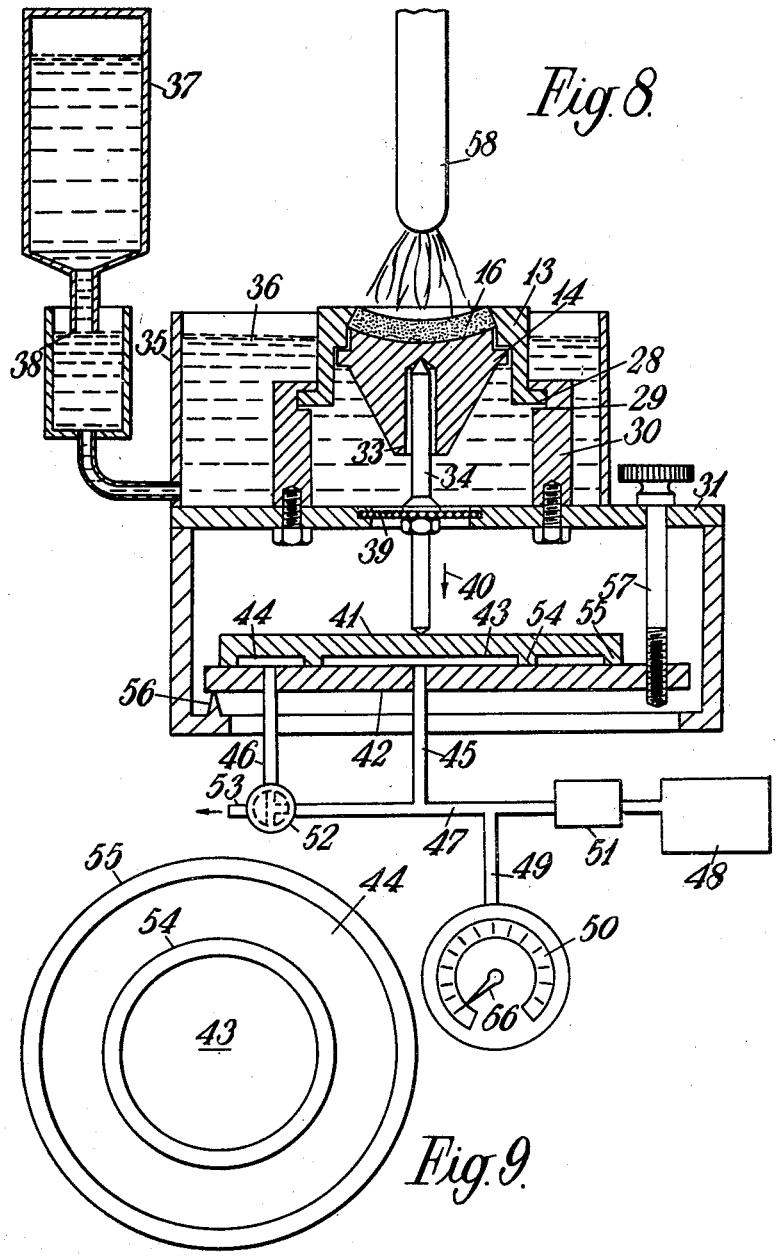

3,182,486
PROCESS AND APPARATUS FOR MEASURING THE
THERMAL EXPANSION OF MOLDING SANDS
Wilhelm Patterson, Intzestrasse 5, and Dietmar Boenisch,
Haselsteig 11, both of Aachen, Germany
Filed Sept. 14, 1962, Ser. No. 223,617
Claims priority, application Germany, Oct. 2, 1961,
P 27,960
19 Claims. (Cl. 73—16)

The present invention relates to a method and apparatus for measuring the high-temperature properties of molding sands and other refractory materials.

With hitherto known methods, the properties of molding sands were measured with cold sands and describe only the properties prior to the filling of a mold. They do not permit the reliable determination of casting faults to be expected which usually occur only in the hot stage.

A large part of the faulty castings caused by the molding sand is due to the thermal expansion of the sand, comprising the differential thermal expansion of the various constituents, and also the crystallographic transformation and especially the transformation of quartz from beta- to alpha-quartz at 575° C. It is already known that during the casting, the drying and expanding surfaces of wet molds may form a scale, in that the mold surfaces become detached in the case of unsuitable moldings sands or compositions, because the moisture which has been expelled by the heat passes in the form of water vapor through the porous molding sand and condenses in the cooler zones of the sand mass, parallel to the surface of the mold. The strength of this condensation zone, usually referred to as wet strength, is lower than that of the adjacent hotter or cooler sand layers, due to excess moisture and higher temperatures, and may amount to $\frac{1}{20}$ to $\frac{1}{3}$ of the green strength.

There have already been attempts at measuring the forces caused by heating in a dry sand and to conclude from these values on the behavior of the sand during the casting. It has already been proposed to heat cylindrical test bodies in a furnace and measure the axial expansion and the expansion force by means of a movable ram. It has been found that the expansion force rises generally with the temperature, but could be reduced by the addition of wood dust or coal dust, while addition of quartz meal increases the expansion force. According to another testing method, cylindrical test bodies of 28 mm. diameter and 50 mm. length are heated to test temperature within about 12 minutes in an electrically heated radiation furnace. Expansion, heat distortion and expansive forces when hot were measured. The specimen is hydraulically loaded and the pressure may be continuously varied. Stress-deformation graphs can be established, and the overall deformation up to the fracture of the specimen is here referred to as hot deformation.

According to yet another method, specimens of cylindrical shape, with 50 mm. height and 50 mm. diameter are heated in an electric field and reach test temperature of 1000° C. within 3 minutes. Here, the expansion is measured as a function of the temperature under a load of about 500 grams. Hitherto used compact or hollow test bodies of cylindrical shape with 50 mm. height and diameters of 28 mm. or 50 mm. were always dried before the test and then heated within minutes as uniformly as possible to a certain temperature, say, to 650° C. or 980° C. The various methods yielded different results, and no general connections between the found properties and the inclination to faults could be established. In many respects, the results are even contradictory.

The invention has the object of eliminating these drawbacks and of providing a method and apparatus, corresponding or adapted to the behavior of molding sand or of a refractory lining during the heating, and also making possible not only the heating and assessment of dry specimens but also of wet specimens within a few seconds, in order to produce a temperature gradient the steepness of which is caused by the bad thermal conductivity of the sand. For measuring the high-temperature properties of molding sands or refractory materials it is presently proposed to condense the sand to a thin plate, constrain or hold the same over part of its periphery or over its whole periphery, heat the plate on one side, and measure the thermal expansion of the plate. The thin test body has a wall thickness of preferably 2 to 5 mm., and may also be of rectangular shape. Since a sand plate, heated only on one side according to the invention, behaves, in view of the steep temperature gradient, like a bimetal strip and expands in the direction towards the heat source, the measuring and, where provided, also the loading device will be located between the heat source and the test body. Since this may often be undesirable and expensive, it is currently proposed to use a concave test body, the concave side of which is heated. In order to produce uniform stress conditions, the test body has preferably the shape of a spherical plate.

The thickness of the plate which consists of condensed molding sand, possibly with the usual moisture content and the usual or intended additives, or the thickness of the refractory specimen, should be as small as possible, in order to produce thorough heating and a constant measuring value within the shortest possible time. However, since thin sand plates are very difficult to compact uniformly and their mechanical strength is insufficient for the test, it is proposed to produce the plate, especially for testing moist sands, from two layers, so that the side of the plate facing the heat source consists of sand to be tested, while the remote side consists of a substance with little or no thermal expansion. Conveniently, this second material consists of, say, zirconium sand, olivine sand or chamotte granulate, and these substances are condensed preferably together with the sand so as to form the plate. Preferably, the binders selected for these substances have a low wet strength so that the expansion of the test sand layer is inhibited as little as possible. Since according to this proposal interesting measurable expansive forces arise only in the layer of sand, which need have a thickness of only about 2 mm., the measuring value may be obtained in an even shorter time, namely within about 30 seconds.

The method according to the invention and the present configuration of the test body are also very suitable for measuring the effects of facing or blackening and the like on the expansive forces of molding sands. To this end, these coatings are applied to the surface of the test body to be heated. Similarly, test bodies may also consist of different layers of sand, and the expansive forces of the multi-layered test body indicates the inhibition or strengthening of the expansion of the individual layers. Also, the high-temperature properties of sands other than those bonded with clay may be measured, such as carbon dioxide sand, cement sand, resinbonded sands or cores, as well as furnace linings and wall linings of compacted materials and refractory bricks, the strength of which depends largely on the expansive forces and the hot deformation capacity of these substances. Furthermore, by suitably adapting the configuration of the space to be heated, the expansive forces of test materials containing combustible or evaporating substances may be investigated, especially in oxidizing or reducing atmospheres.

According to the proposal of the invention, to use for the measurement a thin plate and heat this plate within a short time on one side only, it is possible to take into consideration also the volatile, combustible or liquifying additives added to the green sand, and their effects on the high-temperature behavior. Furthermore, the thin plate, capable of being heated very quickly, produces a very steep temperature gradient, resulting in agreement with the conditions existing in the mold, especially in the presence of strongly expanding quartz sands, in a strong expansion gradient, so that strong stresses occurring between the individual sand grain layers and the high-temperature properties are strongly affected. According to the feature that also molding sands with the usual moisture contents are tested, there results in consequence of the clamping temperature gradient a condensation zone so that the excessive moisture of the sand in the condensation zone affects the strength of the binder and thus also the subsequent heat deformation capacity. Furthermore, the wet strength of the condensation zone causes a specific inhibition of the expansion of dry surface layers located on wet zones.

The test bodies may be manufactured on conventional packing equipment and are then fitted into the heating and testing apparatus in order to determine the expansive forces. However, this requires very accurate manufacturing tolerances, and it is therefore proposed, according to a further feature of the invention to use the parts of the packing apparatus surrounding the test body also for the subsequent expansive forces test. This makes it possible to make the plate comparatively thin because it is permanently surrounded and held by parts of the packing apparatus, corresponding to the subsequent testing apparatus.

The test apparatus consists conveniently of materials with very low thermal expansion, such as Invar steel. It is also proposed to hold these during the measurement by means of structural elements of quartz glass and provide transfer means to the measuring dial or the like also made from these or other materials with a low coefficient of expansion.

A packing and testing apparatus according to the invention may consist, for example, of a ram with concave top surface, and a support ring surrounding the rams within the zone of this top surface, extending beyond the same, and also guiding the ram during the expansive forces test. The support ring has a circular support for the test body; this supporting face may be slanting so that the partly spherical body is supported at least substantially at a right angle.

In a particularly preferred embodiment for measuring the expansive forces, the support ring rests on vertical quartz tubes and the remaining quartz tube located opposite the heat source within the ram, and serving to transmit load and elongation, is centered in the bottom of the ram.

The one-sided heating of the thin test body, having the form of a plate or part of a sphere can be effected by various means, but should always be such that the whole surface of the test body is heated as uniformly as possible. The heat may be supplied by an electric radiation source, such as arc electrodes near the surfaces to be heated. The heating may also be effected by electric resistance wires and also the additional use of radiation mirrors is possible in order to heat the surface to be heated quickly and uniformly.

Particularly simple and expedient is the use of an oxygen-town's gas flame, where the composition and read off rotameters may be controlled by taps.

Also the elongation may be measured in various ways. The amount of curvature of the spherical shell during the heating and the resulting reduction in the radius may be measured optically. In a very simple arrangement, the expansion of the test body is transmitted upwardly by a quartz glass tube to a dial indicator.

Conveniently, the measuring apparatus is screened against the heat source by an asbestos partition or housing.

The loading is increased by means of weight through the ram resting against the convex side of the specimen. By testing under various loads or by continuous load changes during the test, it is possible to find or extrapolate the load which just balances an expansion of the test body. From this load, the diameter and radius of curvature of the specimen, the expansive forces may be calculated quantitatively in kg./qcm.

However, the expansive forces may be taken, after a single measurement with incomplete inhibition of the expansion from a nomograph, if the values of the expansion of the corresponding test load, and the diameter of the test surface resting against the ram of the apparatus according to the invention are inserted therein.

A rising load may also be applied, for example, by means of an arrangement comprising a cylinder and piston, transmitting with rising hydraulic or pneumatic pressure a rising load to the ram of the apparatus.

Of particular advantage is an arrangement in which the ram with an upwardly facing concave end face receives the spherically shaped plate of testing material, the edge of which plate is fixed in an oblique support of a holding ring surrounding the ram, and wherein the holding ring, forming a measuring head, is connected by a bayonet lock with holding bolts mounted on the base plate of a water tank, and wherein ram, holding ring, and bolts are under water or surrounded by water, with the test plate being heated from above, and the ram having a rod projecting through the bottom of the water tank and sealed therein. In this connection, it is proposed to make the holding ring and the ram of a material with good thermal conductivity, and more particularly of copper, whereby the heat emitted by heating the test plate is transmitted to the water bath or cooling bath causing the water to be raised to boiling point. Since water boils at 100° C. and a continuous water supply is insured, maintaining the water level constant, results in that during the test, the temperature of the structural elements surrounding the plate is kept constant near 100° C., thus avoiding any falsification of the measuring results, especially due to an increase in the outer diameter of the holding ring which might, in turn, increase the radius of curvature.

Furthermore, in order to eliminate faulty measuring results due to tilting, or incorrect connections between the holding ring and the bolts, and to insure that the plate rests fully on the entire surface of the ram, the rod projecting from the tank is freely guided in a bore in the ram, and the seal between the rod and the bottom of the tank is effected by a rubber disc connected with the bottom plate and with the rod. An additional rod guide outside and/or inside the water tank is particularly advantageous in such situation. In order to prevent the test plate from expanding outwardly and to compensate for the resulting internal stresses in the plate, wherein the compensating force is a direct measure of the expansive forces, it is proposed according to a further feature of the invention for measuring the expansive forces that the rod should rest against the upper side and center of a plate, resting on a further plate at least over its entire rim, wherein the facing sides of the plates are ground and a space is provided between such plates, connected through a duct with an air blower, and wherein the air duct connecting the cavity between the two plates with the blower contains a pressure gauge. When the test plate is not yet heated, the rod does not exert any pressure on the upper plate and the air pumped by the blower into the space between the two plates escapes past the joint between these plates. Since there is no counter-pressure, the pressure gauge indicates zero value. When the two plates are pressed together, owing to the heating of the test plate, the amount of air escaping past the joint decreases and an overpressure forms in the cavity which is transmitted to the pressure gauge and indicated.

According to a further feature of the invention, the upper and lower plates are round and the upper plate, actuated by the ram rod, is equipped with two separate chambers, defined by recesses formed in the underside and arranged centrally relative to the center of the plate, each of these chambers being associated with air ducts which pass through the lower plate and lead to the blower, and wherein a pressure gauge is located in the communicating duct, with the air duct to the outer annular chamber having a valve provided with a three-way cock. Due to this feature, there are formed several measuring ranges, because, for example, the compressed air may be introduced into the center chamber, flowing as a function of the pressure exerted on the plate through the gap between the plates into the outer chamber, and from here through the discharge duct toward the outside. A wider range is obtained by effecting both chambers with compressed air which may now escape only through the gap between the mating faces. If the air duct to the center chamber contains a two-way valve opening or closing the connection with the blower, and opening the connection between the center chamber and the outer air, such two-chamber arrangement provides a triple measuring range. There may also be more than two chambers.

The blower comprises conveniently an oscillating armature pump. In order to provide for the adjustment of the apparatus, the lower plate is pivotably located on one side of its outer periphery and may be lifted and lowered by a screw spindle actuating the opposite end, causing the rod to be lifted or lowered and rest against the ram, and regulate zero reading on the pressure gauge dial with a predetermined pressure in the chambers between the plates.

In addition to measurements of the unloaded or uniformly loaded or differentially loaded specimens and the quantitative determination of the expansive forces, the present apparatus may also be used for measuring other magnitudes, such as, e.g., the hot deformation, and stress-deformation diagrams may be plotted by means of suitable recording apparatus. To this end, the specimen is loaded, according to the requirements after incomplete or complete expansion, until fracture occurs and the compressibility is used for determining the hot deformation.

The value obtained by means of the method of the invention, giving the compressive stress in kg./qcm. is a clear indication of the stability of the mold walls under casting heat, having regard to the wet strength. With the same wet strength and rising compressive stress, the tendency to expansion faults, cracks, folds, ribs, and the like increases.

This tendency to faults of a molding sand can be assessed by means of a general rule:

$$\text{Tendency to faults} = \frac{\text{compressive stress}}{\text{wet strength}}$$

It has been shown that a compressive stress of 1 kg./qcm., measured according to the invention, must be compensated by a wet strength of about 10 g./qcm., to avoid sand expansion faults, the compressive stress of the usual molding sands being between 1–10 kg./qcm.

The invention will be further explained, by way of example with reference to the accompanying drawings, in which:

FIG. 1 shows parts of a packing device for manufacturing the test body,

FIG. 2 shows the parts of the packing device during the test of the high-temperature properties of the test body, FIG. 3 shows an unloaded specimen, FIG. 4 shows the loading of a specimen preventing in part its expansion, FIG. 5 shows a specimen loaded in such a way that its expansion is completely inhibited, FIG. 6 shows a testing body in two layers, FIG. 7 shows the entire testing arrangement for measuring the expansive forces.

FIG. 8 is a vertical cross-section of another testing apparatus.

FIG. 9 is a view of a plate with chambers.

In FIG. 1, sand 16 is packed by means of a ram 10 and the die of packing device 11, guide ring 12, holding ring 13, piston of head 14 and ram base 15 so as to form a thin plate. Owing to the concave shape of the piston crown of the head 14, and the convex shape of the die of the packing device 11, the plate has the shape of a spherical shell, the edge of which rests on sloping surface 17 of the holding ring 13. The test body has a diameter of 50 mm. and a thickness of 3 mm.

As shown in FIG. 2, the ring 13 and the piston of the head 14 of the packing device are used together with the embedded test body 16 for testing the expansive forces. FIG. 2 also shows the mounting of the holding ring 13 on quartz tubes 18, the transmission of the pressure exerted on the specimen 16 through a quartz tube 19, and the transmission of the expansion of the test body to a measuring device, to be described in detail later, through the same quartz tube 19, guided concentrically in the head 14, and centered to this end in the base of the piston. In FIG. 2, the heating device is shown diagrammatically at 20, and is used for heating the body 16 on one side. In this embodiment as a gas burner is used, the heating time amounts to 30–40 seconds.

FIG. 3 shows an unloaded test body which may freely expand. It will be seen that between the ram and the body there is a point contact and during measurement, free expansion does not occur since the piston per se constitutes a load.

In FIG. 4, the test body is affected by a load $p$, preventing expansion in part. The contact zone between the piston and the test body is illustrated by the arrows denoted $h$.

In FIG. 5, the load affecting the test body is so large that any expansion is prevented thereby, and the expansive forces are eliminated by transposition of the individual quartz grains. The specimen rests against the piston with its entire surface.

FIG. 6 shows a test sand consisting of two layers, the layer facing the heat device or source 20 consisting of test sand 16 and the remote layer of zirconium sand 21. Also here, 14 is the piston of the testing head and 13 the holding ring. The dotted line indicates the condensation zone 22, S is the thickness of the dried sand layers, $F_N$ the effective zone of the wet strength and F is the effective zone of the expansive forces. The mold surface is heated in the direction of the arrows 23.

FIG. 7 shows the overall construction of an apparatus for measuring the expansive forces. In addition to the parts shown in FIG. 2, there is also shown a measuring dial 24 and a plate 25 with a weight 26. Gas taps 27 serve to regulate the combustion gas and oxygen for the heat source 20 and a rotameter 28 indicates the composition of the gas and makes it possible to effect an adjustment.

In FIG. 8, the test body 16, held in the holding ring 13 as described above, rests on the piston 14, the upper side of which corresponds to the curvature of the plate. The holding ring 13 has a circumferential flange 28 which engages with a bayonet lock into recesses 29 of retaining bolts 30, connected with a base plate 31 by means of screws 32.

Preferably, there are provided three retaining bolts 30 (although the drawing shows two diametrically opposed bolts in vertical cross-section). The piston 14 and the holding ring 13 are made of a metal with excellent thermal conductivity and especially of copper. The retaining bolts are of Invar steel which has no thermal expansion up to 100° C. The piston 14 has an axially extending blind bore 33, terminating in a point. Within this axial bore, there is a piston rod 34 with a smaller outer diameter than the inner diameter of the bore 33.

The end of the piston rod 34 is also pointed so that there is only a point contact between these two parts. This arrangement is surrounded by a wall 35, forming a water tank 36, and receiving a continuous water supply as a function of the water loss by evaporation from a storage tank 37 which supplies water when the water level sinks below a certain value, corresponding to outlet 38 of the tank 37.

The piston rod 34 passes through the base plate 31 and is sealed therein by a diaphragm 39 of rubber, which insures, in addition to the seal, also the easy bending, when the piston rod is pushed downwards in the direction of the arrow 40. The mounting of the diaphragm in the base plate 31 and the connection with the piston rod 34 is shown merely diagrammatically.

The lower point of the rod 34 presses on a plate 41 resting on a further plate 42. Both plates 41, 42 are circular and the underside of plate 41 has chambers 43 and 44. Each chamber 43, 44 is connected to air ducts 45 and 46 passing through the plate 42, and leading to a duct 47 which leads, in turn to a blower 48, formed by an oscillating armature pump. The duct 47 is also connected with a further duct 49 leading to a pressure gauge 50. Between the duct 49 and the pump 48 there is a pressure equalizing vessel 51, filled preferably with cotton wool and having the purpose of equalizing pressure fluctuations caused by the pump and the cleaning of the compressed air. Between the duct 46 and the duct 47 there is a valve 52 provided with a three-way-cock so that, according to the position of the valve 52, the duct 47 may communicate with the duct 46 and, on the other hand, ducts 47 and 46 may be separated and the duct 46 connected to a duct 53 leading outside. Accordingly, according to the position of the three-way cock, the pump 48 may supply either chamber 43 or both chambers 43 and 44, when, with the valve in the appropriate position, the pump supplies compressed air to the chamber 43, the air flows with unloaded plate 41 through the narrow gaps between the ring 54 and the plate 42 into the chamber 44 and from here through ducts 46 and 53 to the outside. If, as is possible, the duct 46 is also connected, the air escapes through the narrow gap betwen the ring 55 and the surface of the plate 42 directly into the ambient air. Then, the pressure gauge 50 shows no pressure indication or indicates only a negligible pressure which is used as zero value for the measurement. When the piston rod exerts a pressure in the direction of the arrow 40, in consequence of heat being applied to the specimen 16, the plates 41, 42 are pressed together more strongly, and the possibilities for the air to escape through the narrow gaps become smaller with rising contact pressures of the plates 41, 42. The pressure in the pressure gauge rises and with it also the indication of pointer 56, which reaches its maximum deflection when the expansive forces of the specimen reach their maximum values. By means of the ducts 46, 45, the two chambers may be pressurized so that there results a wider measuring range as a function of the affected surface. A wider measuring range will be selected where the test body will yield high expansive forces, due to its material composition, and a narrow measuring range, where the expansive forces to be expected in the test body 16 are small.

The plate 42 is located at its outer edge on a knife edge 56 and may be lifted or lowered by means of a screw spindle 57 actuating the opposite end of the plate 42. In this way, the piston 14 may be brought into contact with the underside of the test body 16, and a small bias may be preset as zero value for the measurement.

Burner 58 is supplied preferably by acetylene and operates according to the principle of a Bunsen burner so that the required combustion air is drawn in automatically. A gas should be used which makes possible the quick heating during a period of time corresponding substantially to the heating time of the sand when the mold is filled with molten metal. The burner 58 is turnable so as to allow the specimen to be located within the holding ring. When the burner is moved into the operating position, it passes an ignition flame or spark, causing ignition to be effected automatically. This turning movement also opens and closes the supply of gas to and from the burner.

We claim:
1. A method for measuring the high temperature properties and more particularly the expansive forces of moulding sands and other refractory materials, comprising the steps of compressing the testing material to provide a thin disc of substantially uniform thickness, constraining said disc over at least a part of the edge thereof, heating the thus constrained disc on one side only, and measuring the resulting thermal expansion of the disc.

2. A method for measuring the high temperature properties and more particularly the expansive forces of moulding sands and other refractory materials, comprising the steps of compressing the testing material to provide a thin disc having a concave surface, constraining said disc over at least a part of the edge thereof, applying heat to said concave surface, and measuring the resulting thermal expansion of the disc.

3. A method for measuring the high temperature properties and more particularly the expansive forces of moulding sands and other refractory materials, comprising the steps of compressing the testing material to provide a thin circular disc of uniform thickness having concave and convex surfaces, constraining said disc over at least a part of the edge thereof, applying heat to said concave surface, and measuring the resulting thermal expansion of the disc.

4. A method for measuring the high temperature properties and more particularly the expansive forces of moulding sands, comprising the steps of compressing green moulding sand to provide a thin disc having a concave surface, constraining said disc over at least a part of the edge thereof, applying heat to said concave surface, and measuring the resulting thermal expansion of the disc.

5. The method as claimed in claim 2, including the further step of applying a coating to said concave surface.

6. The method as claimed in claim 2, including the step of applying heat to said concave surface in an oxidizing or reducing atmosphere.

7. A method for measuring the high temperature properties and more particularly the expansive forces of moulding sands and other refractory materials, comprising the steps of compressing two layers consisting of a material having at most little thermal expansion and test sand to provide a thin disc, constraining said disc over at least a part of the edge thereof, applying heat to the layer of test sand, and measuring the resulting thermal expansion thereof.

8. An apparatus for measuring the high temperature properties and more particularly the expansive forces of moulding sands and other refractory materials, including a ring having axially extending sides for holding a thin disc of the test material and constraining the disc over at least a part of the edge thereof, supports for said ring, a piston positioned in said ring for engagement with one side of the disc, means for applying heat to the other side of the disc, an element in contact with said piston for transmitting load to the disc, and measuring means operatively associated with said element whereby said element transmits the thermal expansion of the disc to the measuring means.

9. The apparatus as claimed in claim 8, in which the disc of test material is defined by a circular body having convex and concave upper and lower surfaces, said piston having a concave crown for coaction with the convex upper surface of the body and said ring being provided with an internal flange having an oblique surface for cooperation with the periphery of the disc body.

10. The apparatus as claimed in claim 9, in which said supports are vertical quartz tubes on which the internal flange of said ring rests and said element is a quartz tube which contacts the center of said piston.

11. The apparatus as claimed in claim 8, in which said heat applying means is constituted by a gas burner.

12. The apparatus as claimed in claim 8, in which said measuring means is defined by a dial gauge.

13. The apparatus as claimed in claim 8, including a partition of asbestos associated with said measuring means for screening the same against the heat developed by said heat applying means.

14. An apparatus for measuring the high temperature properties and more particularly the expansive forces of moulding sands and other refractory materials, including means providing a tank for water, a ring having axially extending sides for holding a thin disc of test material defined by a circular body having convex and concave surfaces, said ring having an oblique surface for cooperation with the periphery of the disc body for constraining the body over at least a part of the edge thereof, a plurality of retaining bolts secured to the bottom of the tank and extending upwardly therefrom, complemental means on said ring and bolts constituting a bayonet joint therebetween, a piston of a material of high thermal conductivity located within said ring and in contact with said water in said tank and having a working face complemental to the convex surface of said disc body, a piston rod associated with said piston and projecting through and beyond the bottom of the tank, means for applying heat to the concave surface of the disc body, and measuring means operably connected to the projecting portion of the piston rod for measuring the thermal expansion of the disc body.

15. The apparatus as claimed in claim 14, including a water storage vessel, and an automatic water feed means connecting said vessel with said water tank.

16. An apparatus for measuring the high temperature properties and more particularly the expansive forces of moulding sands and other refractory materials, including means providing a tank for water, a ring having axially extending sides for holding a thin disc of test material defined by a circular body having convex and concave surfaces, said ring having an oblique surface for cooperation with the periphery of the disc body for constraining the body over at least a part of the edge thereof, a plurality of retaining bolts secured to the bottom of the tank and extending upwardly therefrom, complemental means on said ring and bolts constituting a bayonet joint therebetween, a piston of a material of high thermal conductivity located within said ring and in contact with said water in said tank and having a working face complemental to the convex face of the disc body, a piston rod associated with said piston and provided with a portion projecting through and beyond the bottom of the tank, means for applying heat to the concave surface of the disc body, a pair of spaced plates located beyond the bottom of the tank, the projecting portion of the piston rod pressing against the center of the uppermost plate, duct means communicating with the space between the plates, blower means in communication with said duct means, and a pressure gauge connected to the duct means.

17. An apparatus for measuring the high temperature properties and more particularly the expansive forces of moulding sands and other refractory materials, including means providing a tank for water, a ring having axially extending sides for holding a thin disc of test material defined by a circular body having convex and concave surfaces, said ring having an oblique surface for cooperation with the periphery of the disc body for constraining the body over at least a part of the edge thereof, a plurality of retaining bolts secured to the bottom of the tank and extending upwardly therefrom, complemental means on said ring and bolts constituting a bayonet joint therebetween, a piston of a material of high thermal conductivity located within said ring and in contact with said water in said tank and having a working face complemental to the convex face of the disc body, a piston rod associated with said piston and provided with a portion projecting through and beyond the bottom of the tank, means for applying heat to the concave surface of the disc body, upper and lower spaced apart plates located beyond the bottom of the tank, ring means defining two concentric chambers between said plates, an air duct communicating with each chamber, an air blower, conduit means between said air blower and each air duct, a three-way valve interposed between the conduit means and duct to the outer chamber, and a pressure gauge connected to the conduit means between the duct to the inner chamber and the air blower.

18. The apparatus as claimed in claim 16, including means pivotally mounting the lowermost plate at one point of the periphery thereof, and spindle means operably connected with the opposite side of said plate for raising and lowering the same.

19. The apparatus as claimed in claim 16, in which said heat applying means includes a pivotable gas burner in which the gas supply and ignition is actuated by the pivoting movement thereof.

References Cited by the Examiner
UNITED STATES PATENTS

| | | | |
|---|---|---|---|
| 2,402,738 | 5/46 | Dietert | 73—15.6 |
| 2,471,227 | 5/49 | Marshall | 73—15.6 |
| 2,521,206 | 9/50 | Dietert | 73—15.6 |
| 2,754,675 | 7/56 | Moore | 73—81 |

RICHARD C. QUEISSER, *Primary Examiner.*